United States Patent Office 3,342,364
Patented Sept. 19, 1967

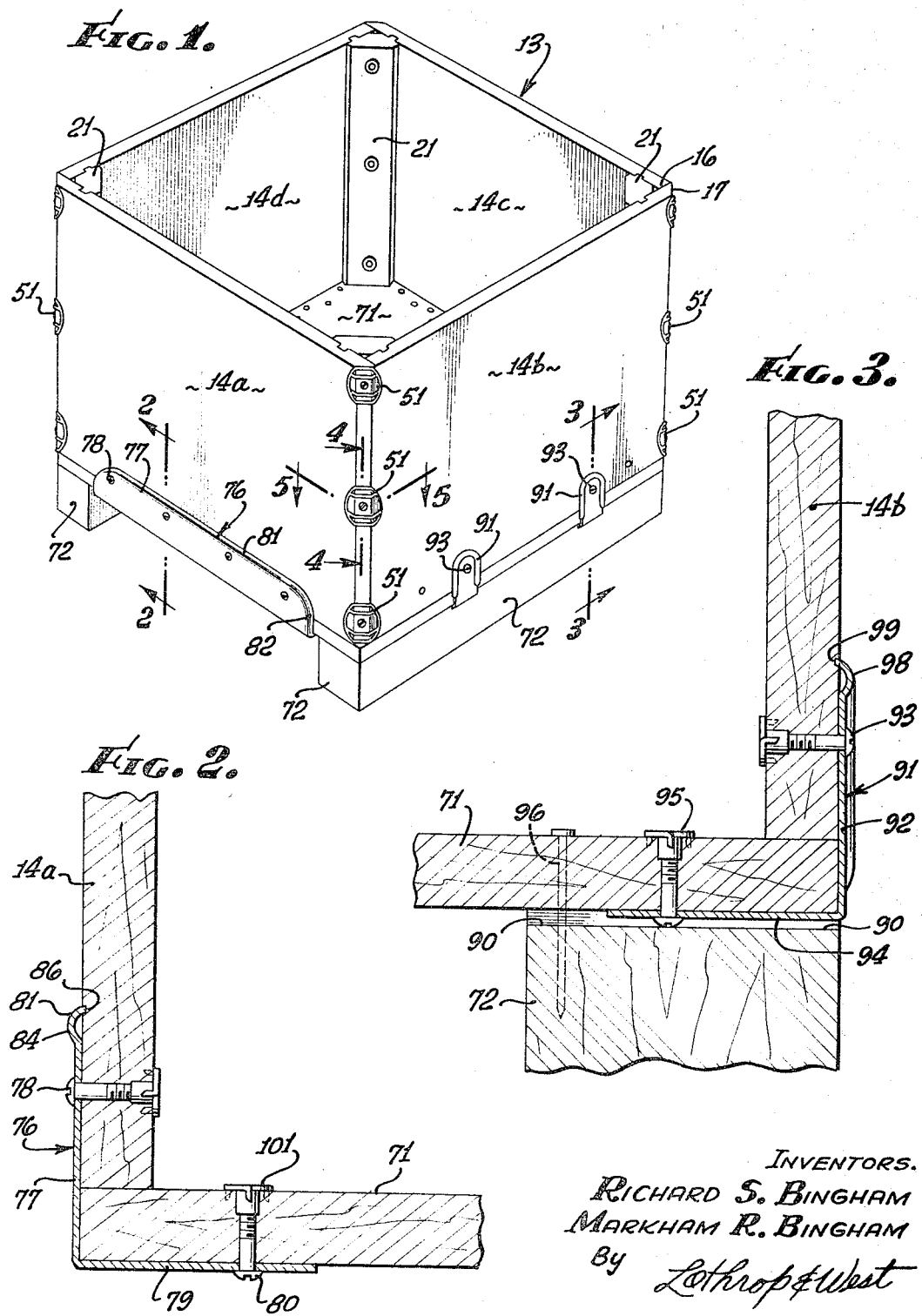

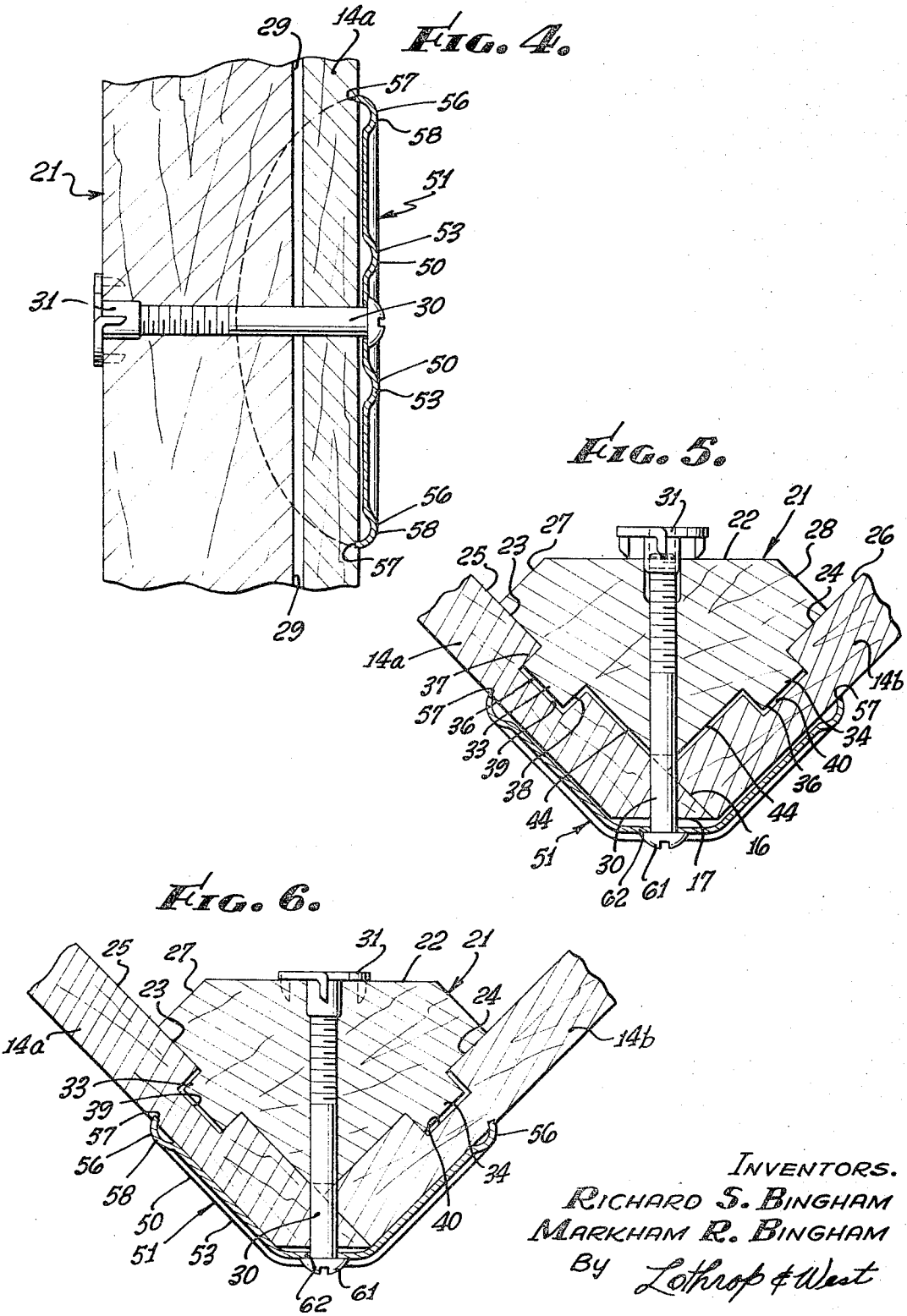

3,342,364
BULK HANDLING CONTAINER
CONSTRUCTION
Richard S. Bingham, 6861 Los Altos Way, and Markham R. Bingham, 7105 El Sereno Circle, both of Sacramento, Calif. 95831
Filed Sept. 13, 1965, Ser. No. 486,738
5 Claims. (Cl. 217—69)

ABSTRACT OF THE DISCLOSURE

In a bulk bin for handling by a fork lift vehicle, the bin including a bottom and four side walls meeting at four corners, the use of hardware comprising metal fastening plates provided with raised beading to afford strength and an imaginary external envelope serving as a bumper against abutting contiguous bins having similar hardware, and internal corner posts serving to clamp with threaded fasteners the adjacent corner portions of the side walls interposed between the post and the associated beaded fastening plates.

The invention relates to improvements in the construction of bins and containers for the handling of products in bulk form.

The escalating costs of labor, as well as progress in the art of bulk handling machinery, have resulted in the ever-widening use of large, sturdy containers capable of handling contents often weighing hundreds of pounds, and of being stacked in precisely arranged rows and to a considerable height. In other environments, and for other purposes, bulk bins are filled with the appropriate load and transported to the desired area for immediate unloading or for subsequent disposition.

The types and kinds of uses of such containers are literally endless.

In almost all cases, however, the containers are subjected to considerable buffeting; and, especially where some degree of precision in handling is required, they are subjected to substantial side scraping and interference resulting from elements projecting from the boxes.

While many of the bulk containers heretofore available have provided a satisfactory degree of strength, none of them, so far as is known, has afforded an external contour, or profile, or envelope, which is smooth and which enables one container to contact or slide against an adjacent container, or other object or person while being moved, without risking an interference between projecting elements which could result in dislodging the container or otherwise causing harm or damage.

It is, therefore, an object of the invention to provide a bulk handling container construction wherein the bins present an external surface which is substantially devoid of sharp or otherwise objectionable protuberances.

It is another object of the invention to provide a bin construction in which the center stringer is eliminated and which therefore facilitates handling with a fork lift.

It is yet another object of the invention to provide a container construction which is extraordinarily strong, rigid, durable and resistant to buffeting.

It is yet a further object of the invention to provide a bin construction which readily lends itself to mass production, with the attendant advantage of low costs.

It is still another object of the invention to provide a container construction which is unusually flexible in that containers of many different sizes and varieties can be cheaply and easily assembled and repaired owing to the use of interchangeable structural members and hardware.

It is an additional object of the invention to provide a bin construction, the assembly of which can readily be learned and used by unskilled personnel and which requires only the use of a screwdriver for assembly.

It is still a further object of the invention to provide a bin construction in which the bin can be shipped in knocked down or partially assembled form, with attendant economies in transportation, and which can quickly be assembled at the destination.

It is another object of the invention to provide a generally improved bulk handling container construction.

Other objects, together with the foregoing, are attained in the embodiments described in the following description and shown in the accompanying drawings in which:

FIGURE 1 is an isometric view of a typical container constructed pursuant to our invention;

FIGURE 2 is a fragmentary, sectional view, to an enlarged scale, of a truss member, the plane of the section being indicated by the line 2—2 in FIGURE 1;

FIGURE 3 is a fragmentary, sectional view, to an enlarged scale, of a bottom angle brace, the plane of the section being indicated by the line 3—3 in FIGURE 1;

FIGURE 4 is a fragmentary, sectional view, to an enlarged scale of a corner clip taken on the plane 4—4 in FIGURE 1;

FIGURE 5 is a fragmentary, sectional view, to an enlarged scale, of a corner post construction prior to tightening the clamping bolt, the plane of the section being indicated by the line 5—5 in FIGURE 1; and FIGURE 6 is a view comparable to FIGURE 5, but showing the location of the parts after tightening the bolt.

While the container construction of the invention is susceptible of numerous physical embodiments, depending upon the environment and requirements of use, very substantial numbers of the herein shown and described embodiments have been made, sold, and used, and all have performed in an eminently satisfactory manner.

FIGURE 1 illustrates one form of bin 13 constructed pursuant to the invention. The bin includes four identical wooden, vertical side wall panels 14a, 14b, 14c and 14d, all of which meet at right angles to form four corners. One of the vertical end edges of each of the vertical side panels is cut off squarely, as at the end 16 whereas the opposite end of each of the panels is beveled at an angle of approximately 45°, the beveled edge being designated by the reference numeral 17. As appears most clearly in FIGURES 5 and 6, the beveled portion 17 of one panel overlaps the square end 16 of the adjacent panel, this pattern being repeated at each of the four corners, as is shown in FIGURE 1. This construction permits all the panels to be fabricated identically in size and shape, thus engendering economies in manufacture.

Means are afforded to position the abutting ends of panels in a strong and durable manner. Inclusive of such means is a vertical, inner, corner post 21, fabricated from hardwood.

The corner post 21 assumes, in section, a substantially right triangular configuration with a hypotenuse 22, or base, and a pair of legs 23 and 24, the leg 23 being juxtaposed to the wall 25 of the adjacent panel 14a and the leg 24 being in face to face relation to the wall 26 of the adjacent panel 14b.

The right triangular corner post is truncated as at 27 and 28 to meet at right angles at the respective panels. The corner tip of the corner post triangle is also cut off as at 29 (see FIGURES 2 and 4) to avoid interference with the corner joint formed by the panels as the corner construction is tightened into the finished arrangement shown in FIGURE 6.

As appears most clearly in FIGURE 5, which illustrates the relative position of the components prior to tightening of the through bolt 30 in the T-nut 31, the corner post 21 also includes a pair of vertical strips, or splines, or tongues, 33 and 34, projecting outwardly from the corner post walls 23 and 24, respectively.

The tongues each include an outer face 36 and a pair of side faces 37 and 38, the three faces being disposed in a generally rectangular relationship.

The tongues 33 and 34 are disposed within corresponding vertical slots, or grooves, 39 and 40, respectively, rabbeted into the respective panels 14a and 14b.

A predetermined amount of clearance is provided between the tongues and the grooves, as appears most clearly in FIGURES 5 and 6. Upon initial assembly (see FIGURE 5) there exists a substantial clearance between the side face 38 of the tongue and the adjacent wall of the slot. Likewise, there is considerable initial clearance between the outer face 36 of each of the tongues and the adjacent wall of the slot.

As tightening of the bolt 30 is effected, however, the tongues are wedged in the direction of the corner until abutment occurs, as in FIGURE 6, between the side faces 38 of the tongues and the adjacent slot walls. A slight additional tightening of the bolt at this juncture exerts a very strong force against the panels, urging both of the panels toward the corner and into tight abutment with each other, and with the adjacent walls 27 and 28, thus obviating any cracks or openings into which the contents could lodge.

It is to be noted that in final position (see FIGURE 6), a slight amount of clearance is still afforded between the outer faces 36 of the tongues and the adjacent walls of the slots. This clearance is provided so as to avoid abutment or interference between the outer faces 36 and the adjacent slot walls during the cinching operation.

For comparable reasons, a small clearance, or relief, on the order of 1/64 to 1/32 of an inch is provided in the areas of the corner post indicated by the reference numeral 44 (see FIGURE 5). In fully secured position, the gaps 44 are closed (see FIGURE 6), the adjacent portions of each of the panels being forced inwardly to fill the relief clearance, or gap 44.

Cooperating with the internal corner post 21 in affording a strong corner structure is an external corner clamp 51 of metal.

The clamp members 51 are susceptible of assuming a variety of shapes and sizes in dependence upon the intended use.

In the case of the corner clamps shown most clearly in FIGURE 1, the clamps 51 in flat or developed condition are roughly elliptical in outline.

Preferably the clamps include one or more corrugations 53, or projecting ribs, transverse to the major axis of the ellipse, to afford additional strength and to provide an external bumper or ridged surface pattern, the outer tops of the ridges being smoothly rounded, as at 50 in FIGURE 4. Still further strength and protection is afforded by a peripheral bead 56 extending entirely around the margin of the ellipse, the outer top 58 of the bead 56 also being smoothly rounded.

The bead terminates at its margin, however, in a fairly sharp edge 57, or lip, and as tightening of the bolt occurs, the lip 57 is urged into the subjacent wood panel in a biting engagement (see FIGURES 4 and 6). Owing to this engagement, the clamp is not only securely lodged in position, but the exposed sharp edge 57 is buried in the wood, thus avoiding any sharp edges or interfering protuberances which might otherwise catch on surfaces coming into contact therewith.

It will be noted (see FIGURES 4 and 6) that the outermost tip portion 58 of the bead 56 is coextensive with the outermost top portion 50 of the transverse ribs 53, the overall effect being that a plurality of smooth bumpers or guards are afforded. The head 61 of the bolt 30 is also smoothly rounded where it projects slightly from the metal clamp, and thus gives no sharp, objectionable protrusion.

The clamp 51 is formed into a generally frusto-conical configuration in horizontal cross-section, and includes a base portion 62 adapted to overlie the beveled edge 17 in parallel relation thereto. The legs 63 and 64 of the clamp, in turn, are disposed in tight, face to face engagement with the respective, underlying surfaces of the panels, at the conclusion of the bolt tightening operation. Initially, as in FIGURE 5, there is some slight clearance between the clamp legs and the panels, and in fact the legs are initially formed, in cross section, to an angle of approximately 88° with respect to each other, that is to say, if the legs were to be carried out to an imaginary apex, the apex angle would be slightly less than 90°. As a consequence of this construction, the effect of tightening the bolt 31, is to spread the legs slightly, this movement being accompanied by a small translational movement of the biting edges 57 in a direction away from the corner, which movement, in conjunction with the inward urgency of the clamp under bolt pressure, results in a most effective biting action into the wood on the part of the sharp edges 57.

In the form of the device shown in FIGURE 1, the bottom of the box is closed by a bottom panel 71, the entire bin structure being supported, in turn, by a spaced pair of beams 72, or stringers, located on the opposite bottom sides of the box, a major purpose of the beams being to provide a space below the box into which the forks of a lift truck (not shown) can be inserted.

The panels 14a and 14c are each secured to the floor panel 71 by a metal truss member 76 extending substantially across the span between the stringers 72. The truss truss member 76, as shown in FIGURE 1, includes a vertical portion 77 attached to the end panel 15 by suitable fastening 78 (also see FIGURE 2) and a horizontal, inwardly extending flange 79 secured to the floor panel by fastenings 80.

It is especially to be noted that the upper margin 81 and the lateral margins 82 of the truss are formed with a bead construction 84 similar to that previously described, including a sharp edge 86 adapted to bite into the subjacent wood material. So also, the truss member is initially formed to an 88° angularity so that tightening of the truss produces an effective biting action on the part of the lip 86. The bead 84, as before, provides strength as well as a smooth bumper effect. In fact, the trusses afford such strength that the conventional central stringer found generally in bulk bins can be eliminated, thus providing additional ease in maneuvering the forks of the lift truck. The vertical truss portion 77 and the horizontal flange 79 also serve to protect the bin against buffeting and wear from the lift forks.

The side panels 14b and 14d, the floor panel 71 and the beams 72 are secured firmly together by a substantially right angular in section, metal, mounting bracket 91, or angle brace, said bracket including a vertical portion 92 (see FIGURE 3) secured to the side panel by a fastening 93 and a horizontal flange portion 94 secured to the bottom panel 71 by a fastening 95.

The mounting bracket 91 is provided with a raised bead 98 extending around the periphery of the vertical flange portion 92 and with a sharp lip 99 in biting engagement (see FIGURE 3). Again, strength as well as a buffering effect is provided by this bead, the height of the bead 98 being substantially identical with the height of the beads and ribs on the metal corner clamps and the beading around the trusses, thus affording therewith, a smooth uniform, external "envelope" encompassing the bin. In this fashion, there is eliminated the many interfering protrusions heretofore encountered in this type of bin.

The bottom panel 71 is affixed to the bottom stringers as by nails 96, the surfaces of which are suitably coated, as by epoxy resin, to afford a very great holding effort.

One of the major contributions of the bin construction of the invention is the great number of advantages derived from the interchangeability of the parts.

In fabricating the bin, the vertical panels 14a–14d are all cut, beveled, rabbeted and drilled in identical fashion. This is also true of the various types of floor panels which can be used; for example, the floor panels can be smooth, as here shown, or they can be perforated, or slotted or otherwise especially subjected to variations in treatment depending on the use intended. In comparable manner, the hardwood corner posts are shaped and drilled to identical configuration.

At this juncture, suitably dimensioned T-nuts are inserted in the appropriate drilled openings and driven in so that the prongs (see FIGURE 2) are firmly lodged in the panel, with only the smooth, flat cap 101 protruding, the shallow caps 101 of the T-nuts being the only protrusions within the inside of the bin, the extent of the protrusion being insignificant for all practical purposes.

Next, the mounting brackets 91 are secured to the bottom panel, the appropriate bolts being inserted through prelocated openings in the horizontal flange 94 for registry with the previously located T-nuts; and the bolts are then engaged with the threads in the T-nuts, as by a screwdriver, either hand or power driven. Thereafter the floor panel is nailed to the stringers with the flanges 94 disposed in dadoed recesses 90 in the stringers. At this juncture, or earlier, if desired, the trusses 75 are secured to the floor panel, also by use of T-nuts and bolts.

This is followed by placement of the four side panels 14a–14d in the proper sequence of beveled to square edge at the four corners, sliding the four hardwood corner posts vertically downwardly with the splines engaged in the rabbeted slots adjacent each corner, by affixing the trusses and brackets to the side panels and by fastening and taking up on the external, metal corner clamps. Again, the entire assembly is effected by the use of a screwdriver only, this being a feature of great importance where bins are to be assembled, or to be repaired in the field. The complete interchangeability of parts also simplifies field work since any desired kind of member can be selected at random and all spare parts are sure to fit.

It can therefore be seen that the box construction of the invention affords a highly flexible and versatile arrangement wherein bulk handling bins of many different varieties can readily be fabricated and repaired, the common feature throughout being that of great strength, relatively low cost and freedom from objectionable protrusions, both inside the box as well as out.

What is claimed is:

1. A bulk handling container construction comprising:
   (a) four wooden vertical panels joined in abutting relation along their vertical end edges to form four corners, one vertical end edge of each of said panels being beveled at approximately 45°, the other vertical end edge being squarly cut, the inner side of each of said panels including a vertical solt adjacent each vertical end edge;
   (b) internal corner posts mounted vertically in each corner, each of said corner posts being generally right triangular in cross section and including a hypotenuse and a pair of sides extending toward an apex in 90° relation, each of said sides including an outwardly projecting vertical strip having an outer face, a first side face parallel to and facing toward the adjacent corner and a second side face parallel to and facing away from said adjacent corner, said vertical strips being disposed within registering one of said vertical slots in the adjacent vertical side panels;
   (c) a plurality of metal external corner clamps mounted vertically on each corner, said clamps being frusto-conical in cross section, each of said clamps including a base portion covering the adjacent vertical end edges of said vertical panels, each of said clamps also including a pair of legs disposed approximately at right angles, the periphery of said clamp being provided with a raised bead terminating in a sharp lip;
   (d) a bolt extending horizontally through each of said base portions of said clamps, through said abutting vertical end edges of said panels and through said vertical corner posts, the tightening of said bolt being effective to clamp the ends of each of said vertical panels between said internal corner post and said external corner clamp and to drive said lip of said clamp into biting engagement with the underlying one of said vertical panels; and,
   (e) a bottom panel mounted on said vertical panels.

2. The device of claim 1 wherein the tightening of said bolt is further effective to urge the adjacent faces of said internal corner posts and said vertical panels into tight face to face engagement, and said first side faces of said vertical strips into tight face to face engagement with the adjacent walls of said vertical slots in said vertical panels.

3. The device of claim 2 wherein said bottom panel is attached to said vertical side panels by a plurality of right angular metal truss members, the top and side portions of said truss members being provided with an embossed bead having substantially the same extent of outward offset as said bead on said external corner clamps; and means for fastening said truss members to said bottom and said vertical side panels.

4. The device of claim 3 further characterized by a spaced pair of parallel beams located below an opposite pair of said vertical panels, and substantially right angular mounting brackets secured to said beams and said panels, the vertical portions of said mounting brackets being provided with a protruding bead substantially equal in depth to the depth of said bead on said corner clamps and on said truss.

5. In a container having a bottom and four upstanding side wall panels joined at their vertical side edges in abutting relation to provide four corners, the combination of:
   (a) a vertical corner post of substantially right triangular cross-section disposed within each of said corners;
   (b) a plurality of metal clamps each substantially L-shaped in cross section including a pair of legs disposed substantially at right angles and in face to face engagement with the respective underlying surfaces of said side wall panels, each of said clamps further including a raised bead affording an imaginary external envelope spaced from the external surface of said clamp by a predetermined distance; and,
   (c) a plurality of threaded fasteners passing through openings in said metal clamp, through said underlying side panels and into said vertical corner post, each of said fasteners including a head having an axial dimension approximately equal in extent to said predetermined distance between said external surface of said clamp and said imaginary external envelope defined by said raised bead, said bead thereby being effective to protect the outermost portion of said head of said fastener.

References Cited

UNITED STATES PATENTS

| | | | |
|---|---|---|---|
| 486,844 | 11/1892 | Austin | 312—140 |
| 1,403,981 | 1/1922 | Smith | 217—43 |

FOREIGN PATENTS 1,282,830  12/1961  France.

THERON E. CONDON, *Primary Examiner.*

RAPHAEL H. SCHWARTZ, *Examiner.*